US 8,046,508 B2

(12) United States Patent
Leaming

(10) Patent No.: US 8,046,508 B2
(45) Date of Patent: *Oct. 25, 2011

(54) SMART CARD WITH SELF-DETACHMENT FEATURES AND RELATED METHODS

(75) Inventor: Taylor J. Leaming, Austin, TX (US)

(73) Assignee: STMicroelectronics, Inc., Coppell, TX (US)

( * ) Notice: Subject to any disclaimer, the term of this patent is extended or adjusted under 35 U.S.C. 154(b) by 1202 days.

This patent is subject to a terminal disclaimer.

(21) Appl. No.: 10/829,008

(22) Filed: Apr. 21, 2004

(65) Prior Publication Data

US 2005/0240695 A1 Oct. 27, 2005

(51) Int. Cl.
*G06F 13/00* (2006.01)
(52) U.S. Cl. .......... 710/62; 710/104; 710/301; 710/8
(58) Field of Classification Search .......... 710/8, 104, 710/301
See application file for complete search history.

(56) References Cited

U.S. PATENT DOCUMENTS

| | | | | |
|---|---|---|---|---|
| 5,568,179 A * | 10/1996 | Diehl et al. | ........... | 725/143 |
| 6,006,303 A | 12/1999 | Barnaby et al. | ........... | 710/244 |
| 6,122,676 A | 9/2000 | Brief et al. | ........... | 710/9 |
| 6,157,966 A | 12/2000 | Montgomery et al. | ........... | 710/8 |
| 6,157,975 A | 12/2000 | Brief et al. | ........... | 710/104 |
| 6,402,026 B1 | 6/2002 | Schwier | ........... | 235/379 |
| 6,439,464 B1 | 8/2002 | Fruhauf et al. | ........... | 235/492 |
| 6,463,537 B1 | 10/2002 | Tello | ........... | 713/182 |
| 6,523,081 B1 | 2/2003 | Karlsson et al. | ........... | 710/305 |
| 6,547,150 B1 | 4/2003 | Deo et al. | ........... | 235/492 |
| 6,676,022 B1 * | 1/2004 | Guthery et al. | ........... | 235/492 |
| 2001/0056513 A1 | 12/2001 | Ueda | ........... | 710/100 |
| 2001/0056539 A1 * | 12/2001 | Pavlin et al. | ........... | 713/193 |
| 2002/0066791 A1 | 6/2002 | Leydier et al. | ........... | 235/492 |
| 2003/0229745 A1 * | 12/2003 | Shih | ........... | 710/301 |
| 2005/0108571 A1 * | 5/2005 | Lu et al. | ........... | 713/201 |
| 2005/0251596 A1 * | 11/2005 | Maier | ........... | 710/74 |

FOREIGN PATENT DOCUMENTS

| | | |
|---|---|---|
| WO | 00/16255 | 3/2000 |
| WO | 02/23357 | 3/2002 |

OTHER PUBLICATIONS

Information Technology-Identification Cards-Integrated Circuit(s) cards with Contacts, part 12: USB Interface and Operating Procedures, ISO/IEC 2002, pp. 1-19.
Anderson, Universal Serial Bus System and Architecture, Chapter 3: The Big Picture, 1997, pp. 45-46.
Garney et al., USB Hardware and Software, Chapter 11: USB Device Framework, pp. 305-310.

* cited by examiner

*Primary Examiner* — Alford Kindred
*Assistant Examiner* — Ernest Unelus
(74) *Attorney, Agent, or Firm* — Lisa K. Jorgenson; Allen, Dyer, Doppelt, Milbrath & Gilchrist, P.A.

(57) ABSTRACT

An integrated circuit for a smart card in accordance with an exemplary embodiment includes at least one data terminal for providing communications with a host device and a processor for providing an attachment signal on the at least one data terminal for recognition by the host device. Further, the processor also cooperates with the host device to perform an enumeration based upon at least one default descriptor. In addition, based upon a system event, the processor selectively removes the attachment signal from the at least one data terminal and thereafter again provides the attachment signal on the at least one data terminal and cooperates with the host device to perform a new enumeration based upon at least one alternate descriptor.

38 Claims, 2 Drawing Sheets

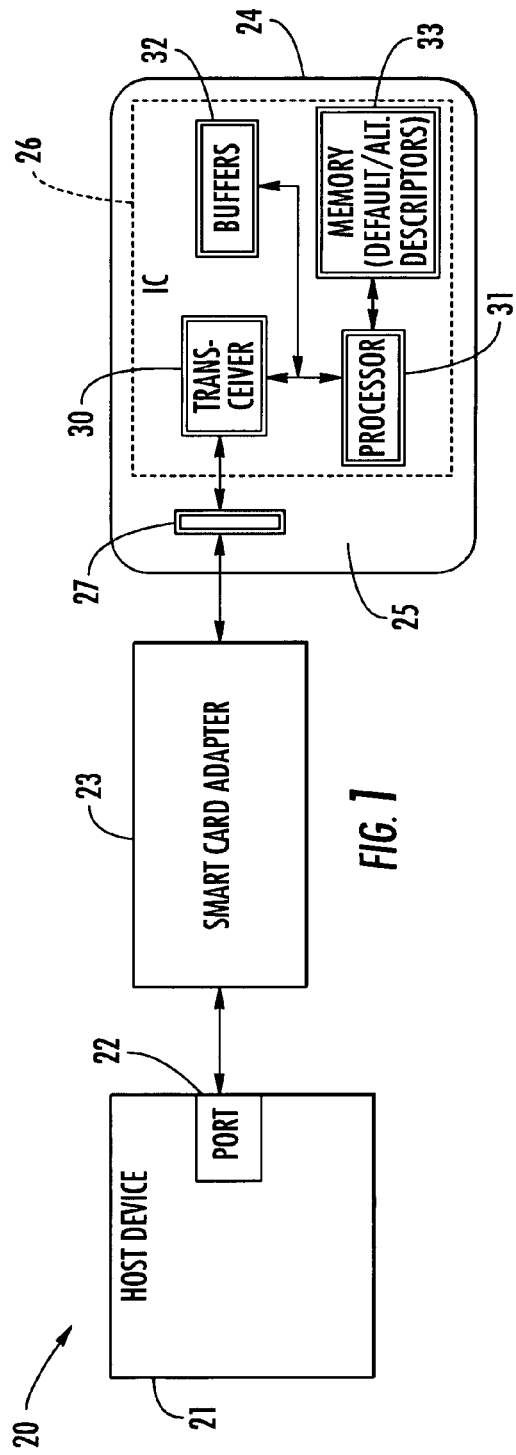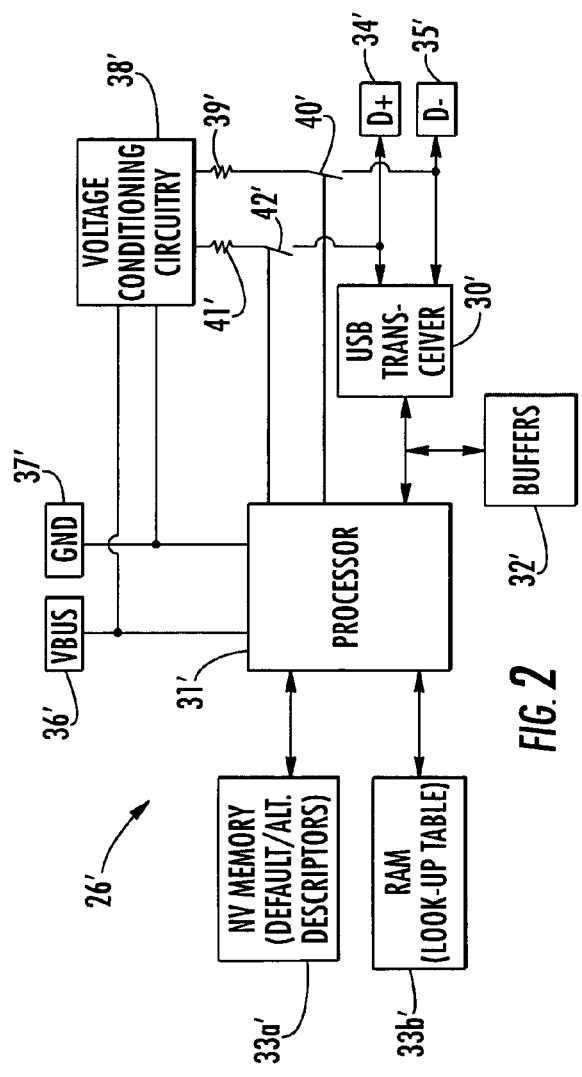
FIG. 1
FIG. 2

SMART CARD WITH SELF-DETACHMENT FEATURES AND RELATED METHODS

FIELD OF THE INVENTION

The present invention relates to the field of information processing and storage, and, more particularly, to smart cards and related methods.

BACKGROUND OF THE INVENTION

Smart cards are becoming increasingly more popular for security and personal identification applications. For example, smart cards are currently used for storing sensitive data such as medical records, banking information, etc. In perhaps their most common form, smart cards have a card body which resembles a credit card in size, shape, and thickness, and they may even be made out of similar materials, such as plastic. Yet, rather than simply having a magnetic stripe to store sensitive information (e.g., account numbers, user identification, etc.) as standard credit cards do, smart cards generally include an integrated circuit (IC). The IC not only includes a non-volatile memory for storing such sensitive information, but it may also include a microprocessor for processing this information and communicating with a host device via a card reader, for example. Accordingly, not only can smart cards store more information than magnetic stripe cards, but they also have much greater functionality.

Various protocols have emerged to standardize the operation and communications of devices such as smart cards. One of the earliest of these was developed by the International Organization for Standardization (ISO) and is known as the ISO 7816-X protocol. In particular, this protocol is set forth in ISO documents ISO 7816-1 (Physical Characteristics), ISO 7816-2 (Dimensions and Locations of Contacts), ISO 7816-3 (Electronic Signals and Transmission Protocols), ISO 7816-10 (Electronic Signals and Answer to Reset for Synchronous Cards), and ISO 7816-12 (USB Interface), for example, all of which are hereby incorporated herein in their entirety by reference.

Furthermore, in response to the increasing popularity of the universal serial bus (USB) architecture, increasing numbers of smart cards continue to be developed which operate in accordance with the USB protocol. This protocol is set forth in the Universal Serial Bus Specification, Revision 2.0, Apr. 27, 2000, published by USB Implementers Forum, Inc., which is hereby incorporated herein in its entirety by reference. The USB architecture is particularly advantageous in that it provides a standard "plug and play" interface for devices external to a computer, for example. That is, external peripheral devices can be relatively quickly and easily installed and removed from a host device, such as a computer, without having to open or power down the computer.

In accordance with the USB Specification, the host device operates as the master of the system bus, and all of the USB devices connected to the system bus operate as slave devices. A USB system bus includes two data lines D+ and D−, over which differential serial data signals are transmitted. Moreover, the USB system bus also includes a power line $V_{BUS}$ which may be used to provide an operating voltage from the host device to USB devices without their own source of power, as well as a ground line.

Accordingly, upon connection to the system bus, a USB smart card will receive power from the power line $V_{BUS}$ which will cause its processor to initialize and announce its presence so that the host device will recognize the device. This is done by connecting a predetermined voltage (e.g., 3.3 V) as an attachment signal to one or both of the data lines D+, D− via a respective pull-up resistor depending upon the data transfer speed at which the smart card is to operate. In particular, the USB Specification defines three data transfer rates, namely low speed (1.5 Mb/s), full speed (12 Mb/s), and high speed (480 Mb/s).

Generally speaking, once the USB smart card is recognized by the host device, the smart card will send information identifying itself and its capabilities to the host device when prompted. This information is incorporated within various descriptors, namely device descriptors, configuration descriptors, interface descriptors, endpoint descriptors, and (optionally) string descriptors. Further information on USB descriptors may be found in the USB Specification. The host device will interpret this data using an appropriate driver and then inform the smart card what configurations and system resources it will be allotted during the current session. The smart card uses this information to enumerate itself for use in the system.

One particularly advantageous approach for managing pull-up connections to the differential data lines is disclosed in U.S. Application Serial No. 2002/0066791 to Leydier et al., assigned to the assignee of the present application, and which is hereby incorporated herein in its entirety by reference. In particular, this application is directed to a smart card which has an IC with voltage conditioning circuitry and a pull-up resistor. The smart card, when inserted in a smart card adapter coupled to a host device, is capable of signaling the host device over a bus using the integrated pull-up resistor selectively coupled to a voltage output of the voltage conditioning circuitry and a first output of the smart card.

The voltage conditioning circuitry output is selectively coupled to the first output through the resistor responsive to the device being powered by the bus (but not transmitting). This tends to pull up the first output to the voltage level of the voltage source, which makes the smart card capable of being properly detected by the host device upon the bus being driven by a host. Selectively disconnecting the pull-up resistor while the smart card is transmitting or receiving results in a more balanced differential output signal. Since the pull-up resistor and voltage conditioning circuitry supplying the proper voltage to the pull-up resistor are an integrated part of the IC, no separate contact is required to supply voltage to the resistor. This permits the smart card to be compatible with the contact configuration of certain existing smart cards, and eliminates the need for the pull-up resistor or voltage conditioning circuitry to be included in the smart card adapter.

Moreover, the device may also be detached from the system bus for other reasons. For example, the device may be detached to perform a re-enumeration, to conserve power, to reduce communications overhead processing by the host device, or when the $V_{BUS}$ power supply is not within the range specified by the USB Specification.

Because of the enhanced functionality afforded by the USB Specification and the significant computing power which may be included in USB smart card integrated circuits, it is possible not only to support multiple applications with a smart card, but also multiple configurations, such as endpoint configurations, for example. An example of a USB device which supports two different endpoint configurations is disclosed in U.S. Pat. No. 6,122,676 to Brief et al. In particular, this patent is directed to a USB device which includes two mappings for relating a received token to an endpoint pipe. A host controller selects which of the two mappings the USB device will use during initialization or enumeration, and the host controller can also cause the USB device to change between the two configurations during operation.

While the above USB smart card devices provide improved operational flexibility, greater flexibility may be required in certain applications to achieve desired bandwidth utilization or even security against attacks to the USB system, for example.

SUMMARY OF THE INVENTION

In view of the foregoing background, it is therefore an object of the present invention to provide an integrated circuit, such as for a smart card, which provides self-detachment and re-enumeration features and related systems and methods.

This and other objects, features, and advantages in accordance with the present invention are provided by an integrated circuit for a smart card which may include at least one data terminal for providing communications with a host device and a processor for providing an attachment signal on the at least one data terminal for recognition by the host device. Further, the processor may also cooperate with the host device to perform an enumeration based upon at least one default descriptor. In addition, based upon a system event, the processor may selectively remove the attachment signal from the at least one data terminal and thereafter again provide the attachment signal on the at least one data terminal and cooperate with the host device to perform a new enumeration based upon at least one alternate descriptor.

More particularly, the processor may detect certain system events which may make the current or default settings established based upon the at least one default descriptor undesirable, and, in response, remove the attachment signal from the at least one data terminal and re-enumerate to change the default settings. By way of example, the system event may be a system utilization metric exceeding a threshold. For example, several devices could be connected to the host device which consume large amounts of system bus bandwidth. In such case, the system utilization metric may indicate that the system bus utilization is above a threshold, which would prompt the processor to remove the attachment signal so that it is no longer recognized by the host device. The processor would then cooperate with the host device to re-enumerate (i.e., following a re-attachment) using one or more alternate descriptors that would allow it to more efficiently utilize the limited bandwidth.

Another example of a system event may be the occurrence of attempted unauthorized communications. That is, if the processor perceives an attack on the system by an unauthorized user or eavesdropper, it may remove the attachment signal and then re-enumerate using a more secure configuration to reduce the likelihood of being compromised by such an attack.

It should be noted that traditional ISO smart cards will go "mute" under such circumstances. However, current smart card designs generally have fairly robust CPUs, more memory, improved anti-tamper mechanisms, etc., as well as some additional (and previously unseen) evasion possibilities. Also, USB allows VSR enumeration/re-enumeration, multiple communication pipelines, USB on-the-go, etc. As the world expands for today's smart cards, so too does their ability to act and react to perceived attacks, while still keeping their propriety architectures secure.

The integrated circuit may further include at least one power terminal connected to the processor, and the processor may receive power via the at least one power terminal during removal of the attachment signal. That is, the processor will still receive power and continue to operate even though it is no longer communicating with the host device. As such, the processor may monitor communications with the host device in a "mute" mode during removal of the attachment signal, for example, if desired.

The at least one alternate descriptor may include at least one device descriptor, configuration descriptor, interface descriptor, and/or endpoint descriptor, for example. Also, the processor may operate in a universal serial bus (USB) mode, for example, and the at least one data terminal may include first and second data terminals for differential data signals, namely D+ and D− terminals in the case of USB operation.

A smart card in accordance with the present invention includes a smart card body and an integrated circuit, such as the one described briefly above, carried by the smart card body. Additionally, such a smart card may be included within a smart card system further including a host device and a smart card adapter connected to the host device for reading the smart card.

A method aspect of the invention is for operating a smart card including at least one data terminal. The method may include providing an attachment signal on the at least one data terminal for recognition by a host device, and cooperating with the host device to perform an enumeration based upon at least one default descriptor. Further, based upon a system event, the attachment signal may be selectively removed from the at least one data terminal and thereafter again provided on the at least one data terminal, and the smart card may cooperate with the host device to perform a new enumeration based upon at least one alternate descriptor.

BRIEF DESCRIPTION OF THE DRAWINGS

FIG. 1 is a schematic block diagram of a smart card system in accordance with the present invention.

FIG. 2 is schematic block diagram illustrating the smart card integrated circuit of FIG. 1 in greater detail.

DETAILED DESCRIPTION OF THE PREFERRED EMBODIMENTS

Figure 3:
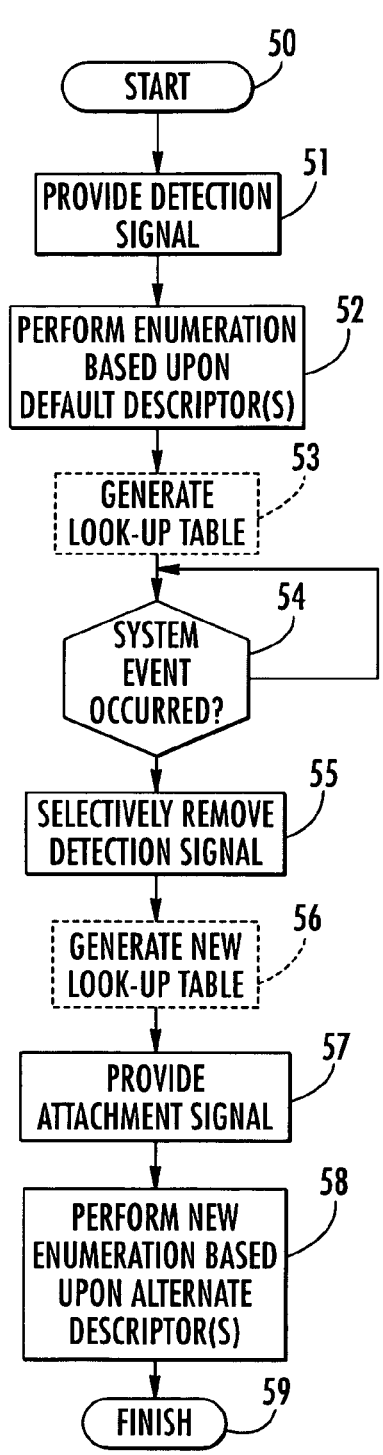
FIGS. 3 and 4 are flow diagrams illustrating methods for operating a smart card in accordance with the present invention.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternate embodiments.

Referring initially to FIG. 1, a smart card system 20 in accordance with the present invention illustratively includes a host device 21 having a communications port 22, a smart card adapter or adapter 23 connected to the communications port, and a smart card 24 to be read by the smart card adapter. Generally speaking, the host device 21 will be a computer of some type, which could be a personal computer (PC), laptop, etc., for example.

Of course, smart card systems take many forms, so the host device 21 could be any number of computing devices capable of interfacing with a smart card, such as a cable or satellite television receiver/decoder, an automated teller machine (ATM) or other banking machine, a point-of-sale (POS) device (e.g., a cash register), etc., depending upon the given application. Another example would be a personal data assistant (PDA) or other USB device that is ordinarily a slave to a USB bus master (i.e., host), but when used in a USB on-the-go (OTG) mode can itself act as a limited USB bus master.

In the case of an ISO 7816 type smart card system, the port 22 may be a serial communications port connected to the internal system bus of the host device 21 (not shown). In the case of a USB type smart card system, the port 22 will be a USB port which is also connected to the internal system bus of the host device 21, as will be appreciated by those of skill in the art. The smart card system 20 may advantageously be implemented as an ISO 7816 type system, a USB system, or a dual mode system which operates in both modes, for example, similar to the system described in U.S. Pat. No. 6,439,464 to Fruhauf et al., assigned to the assignee of the present invention, and which is hereby incorporated herein in its entirety by reference. Of course, other suitable smart card formats may also be used, as will be appreciated by those of skill in the art.

The smart card adapter 23 is of a type compatible with the particular operational protocol being implemented in the system 20 (e.g., an ISO 7816 type card reader, a USB type card reader, etc.). Of course, multiple readers 23 may be used, as well as multi-purpose readers which read more than one type of smart card or multi-mode smart cards. In addition, the card reader 23 can be remotely located with respect to the host device 21, but it need not be. That is, in some embodiments the card reader 23 can be incorporated within the host device 21 or carried by a housing thereof, as will be appreciated by those of skill in the art. Additionally, in some embodiments the smart card adapter 23 may be incorporated into a smart card integrated circuit chip (see below), reducing the "reader" to little more that a "pass through" connector.

The smart card 24 illustratively includes a card body 25 and an integrated circuit (IC) 26 carried by the card body. Further, the smart card also illustratively includes contacts 27 for providing an electrical connection between the smart card adapter 23 and the IC 26. Of course, it will be appreciated that in some embodiments the smart card 24 may be wireless and thus not require the contacts 27. In such event, an antenna may be used instead of the contacts 27, for example. Yet, for clarity of explanation, the present application will refer particularly to the examples of ISO 7816 and USB type smart cards, each of which uses a respective connector configuration defined by the various protocol documents noted above. Thus, the use of physical contacts 27 on the card body 25 (and corresponding contacts at the card reader 23) will be assumed for purposes of the present discussion.

It should be noted that the smart card body 25 may be made of various types of materials and take various shapes. Perhaps the most common material used for smart cards is plastic, but other suitable materials may also be used. Moreover, smart cards are also generally rectangular in shape and thin enough to fit in a wallet, similar to a credit card, but again, other shapes and thicknesses may be used. The IC 26 may be encased within the card body 25, as illustratively shown, or it may be recessed therein but still exposed. Other mounting configurations are possible, as will be appreciated by those of skill in the art, which are anticipated by the present invention. It should also be noted that the smart card 24 may be incorporated or built into another device as a token or identification circuit therefore, for example.

More particularly, the IC 26 illustratively includes a transceiver 30 which is connected to the contacts 27 and sends/receives signals to/from the host device 21 via the smart card adapter 23, as will be appreciated by those of skill in the art. The transceiver 30 is controlled by a processor 31 which also performs the various smart card operations, as will be discussed further below. Furthermore, buffer circuitry 32 is included within the IC 26 for buffering signals transmitted between the IC and the host device 21. One particularly advantageous buffer configuration which may be used in accordance with the present invention is disclosed in co-pending U.S. patent application entitled SMART CARD WITH SELECTIVELY ALLOCATABLE DATA BUFFERS AND ASSOCIATED METHODS, Ser. No. 10/828,946, the entirety of which is hereby incorporated by reference.

An exemplary USB embodiment of the IC 26' is illustratively shown in FIG. 2. As noted above, a USB device announces its presence to a host device by providing an attachment signal on one or both of the differential signal lines D+, D− of the system bus. In the illustrated embodiment, the IC 26' includes data terminals 34', 35' which are connected via the contacts 27 to the differential signal lines D+, D− of the system bus, respectively.

Moreover, the IC 26' also illustratively includes random access memory (RAM) 33a', and non-volatile memory 33b' (e.g., electrically erasable programmable read only memories (EEPROMs), etc.). The RAM 33a' may be used for temporarily storing data to be processed, for example, and may also be used for storing look-up tables for allocating data to respective smart card applications, as will be discussed further below. The non-volatile memory 33b' may be used for storing permanent and/or semi-permanent information which needs to be retained by the IC 26' when not connected to (and powered by) the smart card adapter 23 (e.g., device descriptors, configuration descriptors, interface descriptors, endpoint descriptors, string descriptors, supported USB requests, etc.).

The IC 26' further includes power terminals 36', 37' for connection to the $V_{BUS}$ and ground lines of the system bus, respectively. Moreover, the IC 26' also illustratively includes voltage conditioning circuitry 38' connected to the $V_{BUS}$ and ground lines for providing the appropriate voltage level (e.g., 3.3 V) at the data terminals 34', 35' as an attachment signal for recognition of the smart card 24 by the host device 21.

In particular, when the IC 26' is to operate in a low speed USB mode, the processor 31' causes the attachment signal to be provided to the D− terminal 35' via a pull-up resistor 39' by controlling a switch 40'. Similarly, when the IC 26' is to operate in a full speed mode, the attachment signal is applied to the D+ terminal 34' via a pull-up resistor 41' by controlling a switch 42'. Attachment for high-speed operation initially involves application of an attachment signal to the D+ terminal 34' via a pull-up resistor 41' as well (for more details on high speed attachment, see Section 7.1 of the USB Specification). One particularly advantageous approach for implementing the voltage conditioning circuitry 38' and switching circuitry 40', 42' may be found in the above-described application of Leydier et al., although other suitable circuitry may also be used.

Figure 4:
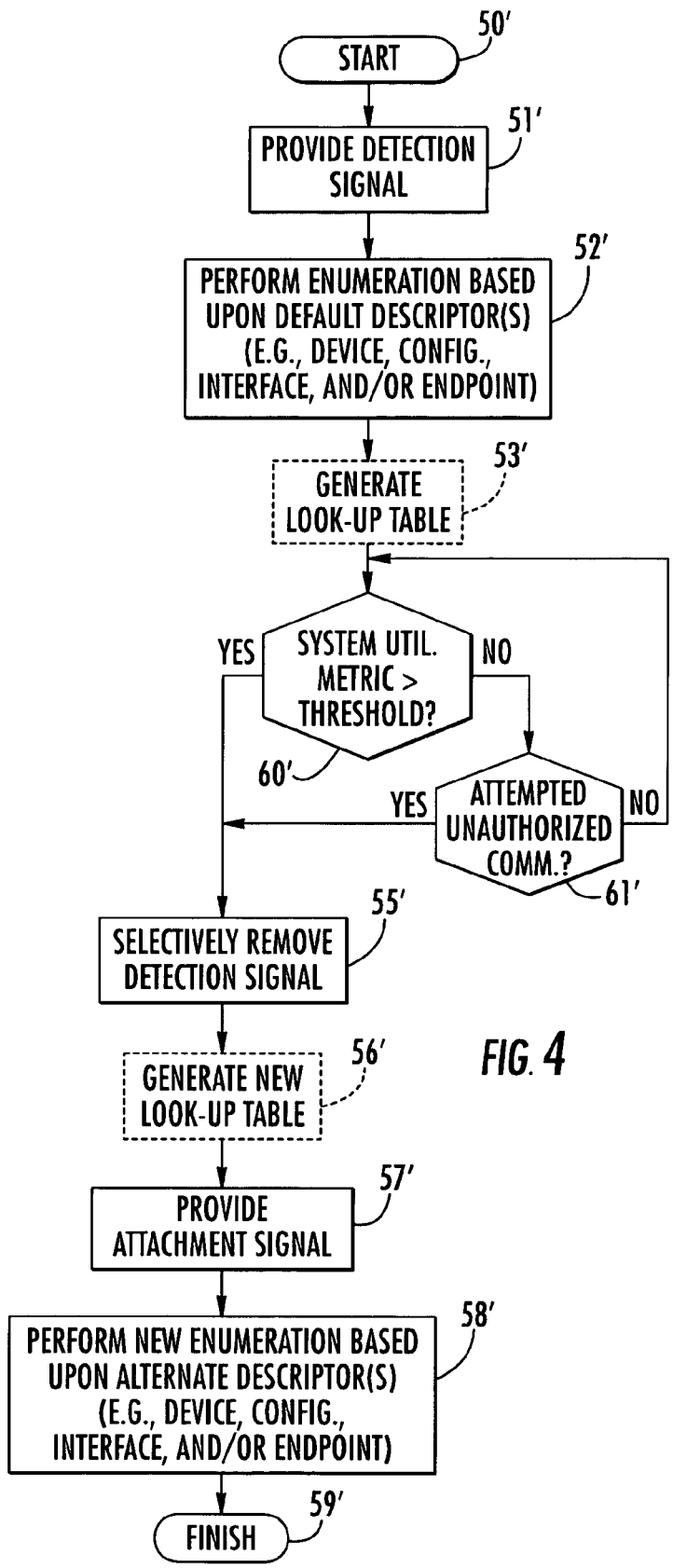

In accordance with the present invention, the card memory 33 not only stores default descriptors for enumerating the smart card 24, as noted above, but it also stores alternate descriptors that may advantageously be used instead of one or more of the default descriptors for enumerating the smart card. More particularly, the use of the default and alternate descriptors for enumeration of the processor 31' will now be described with reference to the flow diagrams of FIGS. 3 and 4. Beginning at Block 50, upon first being connected to the smart card adapter 23, the processor 31' receives its operating voltage from the $V_{BUS}$ terminal 36', which causes it to begin initializing. (It should be noted that the smart card 24 could be (or be included within) a self-powered device which need not receive power from the $V_{BUS}$ terminal 36' to begin such initialization in some embodiments.)

More particularly, following the detection and stabilization of its operating voltage, the processor 31' commences and completes its power-on-reset (POR) sequences, as will be appreciated by those of skill in the art. The default device descriptor(s) for the smart card 24 which resides in the memory 33' is then retrieved and loaded in the appropriate registers, etc. for communication to the host device 21.

The processor 31' makes its presence known on the system bus by connecting the appropriate pull-up resistor 39', 41' to the D− and/or D+ terminals 34', 35', respectively, as described above, (and via appropriate signaling protocols, in the case of high speed operation, for example) at Block 51. This is also referred to as "attaching" to the system bus. Generally speaking, the presence of the newly attached smart card 24 is observed by the upstream smart card adapter 23, and this information is relayed to the host device 21. Once the host device 21 has queried the smart card 24 for its device descriptor, an appropriate USB driver is loaded at the host device for communicating with the smart card. The USB driver will then query the smart card 24 for its remaining descriptors (e.g., configuration, interface, device, and/or string descriptors).

Once the USB host has received the descriptors, it processes these descriptors and, depending in large part upon the bandwidth/processing requirements of other devices connected to the system bus, determines what resources to allocate to the smart card 24. The host device 21 then transmits this allocation information to the smart card 24, and the processor 31' enumerates itself for use in the system 20 based thereon. By way of example, such allocation information may include bandwidth allocations for the supported endpoints, allowed data transmission speed, etc.

Moreover, it should be noted that the IC 26' may in some embodiments advantageously be used for performing a plurality of smart card applications. Indeed, the USB Specification provides for multiple applications in a given USB device, for example, and the ever-increasing computing power available on smart cards is allowing smart cards to take advantage of this functionality. In fact, the processor 31' may have its own an embedded operating system capable of managing multiple concurrent (and embedded) applications (e.g., Java applets). These embedded applications may work in cooperation with the host-side applications (e.g., user log-in and authentication applications, Internet-based banking applications, digital rights management applications for audio/video transfer, etc.). Of course, numerous other applications may be used in accordance with the present invention, as will be appreciated by those skilled in the art.

Yet, without the ability to quickly and accurately allocate data to respective applications, the implementation of numerous smart card applications can become unmanageable. As such, the processor 31' may advantageously generate a look-up table as part of (or after) its enumeration for allocating data to respective smart card applications supported by the processor. More particularly, in the USB environment, the various supported applications have respective endpoints associated therewith. Each endpoint is essentially a direct pipeline to one or more functions of a given applications. For example, a given application will typically have a control endpoint for communicating control requests for the application. It may also have an interrupt endpoint for interrupt requests, as well as one or more bulk and/or isochronous endpoints for data transfer.

Accordingly, in the exemplary USB implementation, the processor 31' may optionally generate a look-up table, based upon PC application (and driver) information, which allocates data received from the host device 21', for example, to the appropriate endpoint established during enumeration for that data, at Block 53. As such, by generating the look-up table and using it for managing for data allocation, the processor 31' advantageously allows substantially simultaneous access to multiple and unrelated smart card resources.

In accordance with another advantageous aspect of the invention, the processor 31' detects one or more system events which indicate that re-enumeration based upon one or more of the alternate descriptors is appropriate, at Block 54. By way of example, the system event may be a system utilization metric exceeding a threshold, at Block 60'. For example, a suitably crafted USB driver may not only collect the default descriptors from the processor 31', but it may also collect relevant information regarding the nature of the other USB devices which are currently being managed by the host device 21.

Based upon this information, the driver may then relay the appropriate information back to the processor 31', which may include an embedded application that uses this information to determine whether some other configuration is more desirable. In particular, this determination may be based upon factors such as the types of PC-based applications requesting resources of the smart card 24 and their likely bus bandwidth requirements, as well as the number and types of other USB devices connected to the system bus and their bus bandwidth allocations, for example.

If the system event has occurred and the processor 31' determines that another configuration is appropriate, the processor will then "detach" itself from the bus by opening the appropriate switch 39', 41', at Block 55, so that the attachment signal(s) will no longer be provided and its presence will cease to be recognized by the host device 21. Furthermore, the processor 31' may then generate a new look-up table based upon the results of the new enumeration, at Block 56. That is, because various settings of the smart card 24 may change from one enumeration to the next, the processor 31' advantageously generates new look-up tables for data allocation as required to account for the reallocation of endpoints, etc.

It should be noted that the look-up table(s) content is established by the USB smart card processor 31' (i.e., there is no control by the host device) based upon decisions it has made. These decisions are influenced by information it has received from the "smart" USB driver (i.e., information about bus utilization, etc., as it is loaded into the kernel) and/or an application (i.e., software) running on the host device 21, which uses the smart card resources of the USB smart card device. Therefore, the look-up table(s) is preferably prepared before enumeration, and more particularly before assertion (i.e., attachment of the USB speed detect pull-up resistors to the D+/D− signal lines).

Later, the device may selectively "detach" (due to a "system event"), change its descriptors and look-up table mappings, reattach and renumerate. That is, the processor 31' reattaches itself to the system bus by providing the attachment signals(s), as noted above (Block 57), and then proceeds to cooperate with the host device 21 as described above to perform a new enumeration, but this time using one or more of the alternate descriptors, at Block 58, thus concluding the illustrated method (Block 59). Indeed, with the new enumeration sequence, the processor 31' may identify itself such that it will more appropriately match the particular USB environment and requirements of the PC-based (or other) applications operating in the system 20 which may soon use its resources, or better utilize available bus bandwidth, for example. It should be noted that a combination of the default and alternate descriptors may be used during successive or new enumerations, i.e., not all of the default descriptors need be changed.

Another example of a system event which may trigger a new enumeration is the occurrence of attempted unauthorized communications, at Block 61', such as would be the case when someone attempts to eavesdrop or hack into the system 20. In particular, observation, tampering, or attacking entities generally rely upon known functionalities and modes of operation of the object of their attack. The target of such activities is very often monolithic in the manner in which it will behave, making it easier for the observer or attacker to figure out what is going on inside the target.

However, since the smart card 24 in accordance with the invention can advantageously change its attributes and how it behaves and appears using alternate descriptors, this will make it much more difficult for a would-be hacker to compromise the security of the smart card 24. That is, the ability to adjust descriptors and endpoint support, in conjunction with the ability to detach and re-attach, makes it possible for the smart card 24 to still perform its intended duties, but in a manner which is less predictable to a would-be hacker or eavesdropper. The ability of a would-be hacker to isolate the smart card 24 as a target by its USB address can be guarded against by effectively changing this address using alternate descriptors. Moreover, if particular endpoints and/or transfer modes are being used to isolate the smart card 24 as a target, the processor 31' can modify the signature patterns which make it "visible" using alternate descriptors, as will be appreciated by those of skill in the art.

Moreover, because the processor 31' will continue to receive its operating voltage (i.e., $V_{BUS}$) during the selective removal of the attachment signals, as noted above, the processor 31' may monitor communications with the host devices 21 (i.e., between the host device and other devices connected to the system bus) in a "mute" mode during removal of the attachment signal, for example, if desired. As such, the processor 31' may keep the smart card 24 in the mute mode until the perceived attack is no longer present, and then initiate the re-attachment and new enumeration. Of course, in some embodiments the driver may disable the downstream port associated with the smart card adapter 23 to which the smart card 24 is attached, which would prevent operation in the mute mode.

Other exemplary system events which may cause the processor 31' to detach from the system bus and perform a new enumeration may include the availability of support for multi-application services, a requirement or availability to change between data transmission speeds (i.e., between low, full, and high speeds), and/or the need to perform a more "sophisticated" power-up or power-down sequence, as will be appreciated by those skilled in the art. Other system events will also be appreciated by those of skill in the art and are contemplated by the present invention.

It should be noted that in some embodiments the IC 26' may also include a mechanism for overwriting those portions of the registers, etc., which store the information about supported endpoints, alternate settings, configurations, and interfaces, as described above. Similarly, it may also be desirable in some embodiments to include a mechanism by which the processor 31' may overwrite the contents of the registers, etc., which store the device descriptor of the smart card 24. Moreover, the way in which the smart card 24 announces its presence to the host device 21 may vary depending upon the particular protocol or implementation used, as will be appreciated by those skilled in the art.

It should also be noted that after each enumeration of a USB device a PC driver is loaded in memory. The PC driver is selected based upon a serial number ID and product ID sent during the enumeration phase. The PC driver can also be available for a class of devices. In this case, the USB device sends the type of class IDs that are compatible during the enumeration, and the class driver is automatically loaded. Thus, in accordance with the invention, if the USB device during the enumeration indicates a special driver and the driver is not present, the device can re-numerate with another driver, vendor ID, or class ID until it finds the correct driver. It could also download, for example, a new Java application. It may then need to load a new PC class, driver, etc. This process could also be used for security reasons. A USB device could jump from one PC driver to another one, and it thus becomes difficult to "spy" on its communication at the PC kernel level, as will be appreciated by those skilled in the art.

Various advantages of the present invention will be apparent to those skilled in the art from the foregoing discussion. For example, multiple host-based applications may be supported and run simultaneously on the same bus, and each with different characteristic bus utilization requirements. The present invention also promotes increased utilization of available USB smart card device resources, as well as the capability to handle relatively high speed bus bandwidth applications, such as real-time bi-directional data streaming and processing and digital rights management, for example. Further, the present invention provides continued support not only for more traditional, low-speed bus bandwidth applications, but also for high-speed bus bandwidth applications such as those noted above.

The various features and advantages of the present invention will be further appreciated with reference to a brief discussion of some of the peculiarities and challenges unique to smart cards. In contrast to typical ISO, USB, etc., devices, smart cards (i.e., smart card ICs) are very secure (i.e., mechanically, physically, electrically, and programmatically). Moreover, smart card ICs have exceptionally few physical pathways between their die and the outside world.

Generally speaking, the flow of data into and out of the "core" of a smart card IC is very carefully managed by a USB Device Core (UDC), well-defined buffering, and through the use of an isolation mechanism (which may be thought of as a highly secure semiconductor (i.e., silicon) firewall). As such, the use of buffering for external communications (i.e., ISO, USB) is necessarily kept outside of this firewall for security reasons. Moreover, the internal CPU of a smart card IC has numerous security mechanisms built into its core to provide the highest possible security between resident applications (e.g., Java applets) and the embedded resources (e.g., RAM, ROM, NVRAM, mathematical mechanisms, encrypted data, particular CPU instructions and functionalities, etc.).

Not only do smart cards have a number of features to prevent observation and tampering from the outside world typically not found in other types of ISO, USB, etc. devices, they also embody well-tuned cores. These cores are generally capable of performing lengthy and complex cryptographic algorithms which can produce in minute fractions of a second results which would take typical computer systems many magnitudes more time, from minutes to hours, to even weeks or months.

Furthermore, smart card ICs are subject to many constraints that other ISO, USB, etc. devices (and also many other ICs) are not. For example, physical size is often a key limiting factor which effects cost, available RAM, etc. Other such constraints include minimal external connectivity requirements, electrical/power constraints, etc. Another important concern of smart cards is the timeliness and completeness with which requested data is generated.

It is in view of the foregoing constraints imposed on smart card ICs (i.e., the silicon firewall, the highly secure CPU core, the exclusive control of the CPU and OS over all else, the specialized internal machinery, the exhaustive memory protection schema, the various anti-spy, anti-tamper, anti-attack mechanisms, etc.) that the features of the invention can be fully appreciated. That is, all of the above constraints impose a significant burden upon smart card IC design, and this burden may be substantially reduced in accordance with the teachings of the present invention, as will be appreciated by those skilled in the art. It should be further noted that, as used herein, "application" is intended to be broadly construed. For example, an application may be a process by which a specified resource is utilized. It may also refer to an operative piece/configuration of software that performs a specific task or set of tasks. As such, "applications" may run on a host device on top of the kernel and associated USB infrastructure (i.e., a custom application for viewing on-line financial information, to view a movie, listen to downloadable music, authenticate logging into a computer, etc.). In addition, applications can also take the form of embedded software programs which run under the robust embedded OS of the smart card. As with PC-based applications, embedded applications may be run concurrent with each other, and vie for various resources and services provided by the smart card and its OS.

Additional features of the invention may be found in co-pending applications entitled SMART CARD PROVIDING DATA MAPPING FOR MULTIPLE APPLICATIONS AND RELATED METHODS; Ser. No. 10/828/747; SMART CARD WITH SELECTIVELY ALLOCATABLE DATA BUFFERS AND ASSOCIATED METHODS, Ser. No. 10/828/948; and SMART CARD WITH SELF-RECONFIGURATION FEATURES AND RELATED METHODS, Ser. No. 10/828/007, the entire disclosures of which are hereby incorporated herein by reference.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. An integrated circuit for a smart card comprising:
at least one data terminal for providing communications with a host device over a system bus; and
a processor configured to
provide an attachment signal on the at least one data terminal for recognition by the host device,
cooperate with the host device to perform an enumeration based upon at least one default descriptor,
receive information from the host device regarding an allocation of system bus bandwidth to other devices communicating with the host device over the system bus,
remove the attachment signal from the at least one data terminal and thereafter again provide the attachment signal on said at least one data terminal based upon the information regarding the allocation of system bus bandwidth to other devices, and
cooperate with the host device to perform a new enumeration based upon at least one alternate descriptor.

2. The integrated circuit of claim 1 further comprising at least one power terminal connected to said processor, and wherein said processor is configured to receive power via said at least one power terminal during removal of the attachment signal.

3. The integrated circuit of claim 1 wherein said processor is configured to monitor communications with the host device during removal of the attachment signal.

4. The integrated circuit of claim 1 wherein the at least one alternate descriptor comprises at least one device descriptor.

5. The integrated circuit of claim 1 wherein the at least one alternate descriptor comprises at least one configuration descriptor.

6. The integrated circuit of claim 1 wherein the at least one alternate descriptor comprises at least one interface descriptor.

7. The integrated circuit of claim 1 wherein the at least one alternate descriptor comprises at least one endpoint descriptor.

8. The integrated circuit of claim 1 wherein said at least one data terminal comprises first and second data terminals for differential data signals.

9. The integrated circuit of claim 1 further comprising a USB transceiver connected between said processor and said at least one data terminal.

10. A smart card comprising:
a smart card body; and
an integrated circuit carried by said smart card body and comprising
at least one data terminal for providing communications with a host device over a system bus, and
a processor configured to
provide an attachment signal on the at least one data terminal for recognition by the host device,
cooperate with the host device to perform an enumeration based upon at least one default descriptor,
receive information from the host device regarding an allocation of system bus bandwidth to other devices communicating with the host device over the system bus,
remove the attachment signal from the at least one data terminal and thereafter again provide the attachment signal on said at least one data terminal based upon the information regarding the allocation of system bus bandwidth to other devices, and
cooperate with the host device to perform a new enumeration based upon at least one alternate descriptor.

11. The smart card of claim 10 wherein said integrated circuit further comprises at least one power terminal connected to said processor, and wherein said processor is configured to receive power via said at least one power terminal during removal of the attachment signal.

12. The smart card of claim 10 wherein said processor is configured to monitor communications with the host device during removal of the attachment signal.

13. The smart card of claim 10 wherein the at least one alternate descriptor comprises at least one device descriptor.

14. The smart card of claim 10 wherein the at least one alternate descriptor comprises at least one configuration descriptor.

15. The smart card of claim 10 wherein the at least one alternate descriptor comprises at least one interface descriptor.

16. The smart card of claim 10 wherein the at least one alternate descriptor comprises at least one endpoint descriptor.

17. The smart card of claim 10 wherein said at least one data terminal comprises first and second data terminals for differential data signals.

18. The smart card of claim 10 further comprising a USB transceiver connected between said processor and said at least one data terminal.

19. A smart card system comprising:
a host device and associated system bus;
a smart card adapter connected to said host device via said system bus; and
a smart card to be read by said smart card adapter and comprising a smart card body and an integrated circuit carried by said smart card body, said integrated circuit comprising
at least one data terminal for providing communications with a host device over said system bus, and
a processor configured to
provide an attachment signal on the at least one data terminal for recognition by said host device,
cooperate with said host device to perform an enumeration based upon at least one default descriptor,
receive information from the host device regarding an allocation of system bus bandwidth to other devices communicating with the host device over the system bus,
remove the attachment signal from the at least one data terminal and thereafter again provide the attachment signal on said at least one data terminal based upon the information regarding the allocation of system bus bandwidth to other devices, and
cooperate with said host device to perform a new enumeration based upon at least one alternate descriptor.

20. The smart card system of claim 19 wherein said integrated circuit further comprises at least one power terminal connected to said processor, and wherein said processor is configured to receive power via said at least one power terminal during removal of the attachment signal.

21. The smart card system of claim 19 wherein the system event comprises a system utilization metric exceeding a threshold.

22. The smart card system of claim 19 wherein the system event comprises the occurrence of attempted unauthorized communications.

23. The smart card system of claim 19 wherein said processor monitors communications with said host device during removal of the attachment signal.

24. The smart card system of claim 19 wherein the at least one alternate descriptor comprises at least one device descriptor.

25. The smart card system of claim 19 wherein the at least one alternate descriptor comprises at least one configuration descriptor.

26. The smart card system of claim 19 wherein the at least one alternate descriptor comprises at least one interface descriptor.

27. The smart card system of claim 19 wherein the at least one alternate descriptor comprises at least one endpoint descriptor.

28. The smart card system of claim 19 wherein said at least one data terminal comprises first and second data terminals for differential data signals.

29. The smart card system of claim 19 further comprising a USB transceiver connected between said processor and said at least one data terminal.

30. A method for operating a smart card comprising at least one data terminal, the method comprising:
providing an attachment signal on the at least one data terminal for recognition by a host device over a system bus;
cooperating with the host device over the system bus to perform an enumeration based upon at least one default descriptor;
receiving information from the host device regarding an allocation of system bus bandwidth to other devices communicating with the host device over the system bus,
removing the attachment signal from the at least one data terminal and thereafter again providing the attachment signal on the at least one data terminal based upon the information regarding the allocation of system bus bandwidth to other devices; and
cooperating with the host device to perform a new enumeration based upon at least one alternate descriptor.

31. The method of claim 30 wherein the smart card further comprises at least one power terminal connected to the processor, and wherein the smart card receives power via the at least one power terminal during removal of the attachment signal.

32. The method of claim 30 further comprising monitoring communications with the host device during removal of the attachment signal.

33. The method of claim 30 wherein the at least one alternate descriptor comprises at least one device descriptor.

34. The method of claim 30 wherein the at least one alternate descriptor comprises at least one configuration descriptor.

35. The method of claim 30 wherein the at least one alternate descriptor comprises at least one interface descriptor.

36. The method of claim 30 wherein the at least one alternate descriptor comprises at least one endpoint descriptor.

37. The method of claim 30 wherein the at least one data terminal comprises first and second data terminals for differential data signals.

38. The method of claim 30 wherein the smart card operates in a universal serial bus (USB) mode.

* * * * *

UNITED STATES PATENT AND TRADEMARK OFFICE
CERTIFICATE OF CORRECTION

PATENT NO. : 8,046,508 B2
APPLICATION NO. : 10/829008
DATED : October 25, 2012
INVENTOR(S) : Leaming It is certified that error appears in the above-identified patent and that said Letters Patent is hereby corrected as shown below:

Column 6, Line 9      Delete: "10/828,946"
     Insert: --10/828,948--

Column 11, Line 36      Delete: "10/828,007"
     Insert: --10/829,007--

Signed and Sealed this
Twenty-eighth Day of August, 2012

David J. Kappos
*Director of the United States Patent and Trademark Office*